United States Patent Office 3,449,794
Patented June 17, 1969

3,449,794
PROFILE-CASTING APPARATUS FOR PROCESSING SYNTHETIC THERMOPLASTICS
Hendrik J. Kalbfleisch, Velp, Netherlands, assignor to American Enka Corporation, Enka, N.C., a corporation of Delaware
Filed June 6, 1967, Ser. No. 644,010
Claims priority, application Netherlands, June 8, 1966, 6607904
Int. Cl. B29f 3/01
U.S. Cl. 18—12    3 Claims

ABSTRACT OF THE DISCLOSURE

A profile-casting apparatus for the processing of synthetic thermoplastics, comprising extruder means for forming the molten thermoplastics into shaped structures with defined profiles, and a drawing-off means for drawing-off and transporting the shaped structures, said drawing-off means comprising a plurality of pairs of driven shafts, mounted one after the other in the direction of transporting the structures, the shafts of each pair being placed horizontal and one over the other, upper and lower crossheads for supporting the ends of the upper and lower shafts in each pair, respectively, said crossheads being attached to members sliding between vertical guides, the members for the lower crossheads being adjustable to predetermined positions, and the members for the upper crossheads being displaced by a control means, all the shafts being driven at the same speed by a common driving means, the direction of rotation of the upper shafts being opposite to that of the lower shafts of each pair and one or more drawing-off elements being exchangeably mounted on each of said shafts.

---

Figure 1:
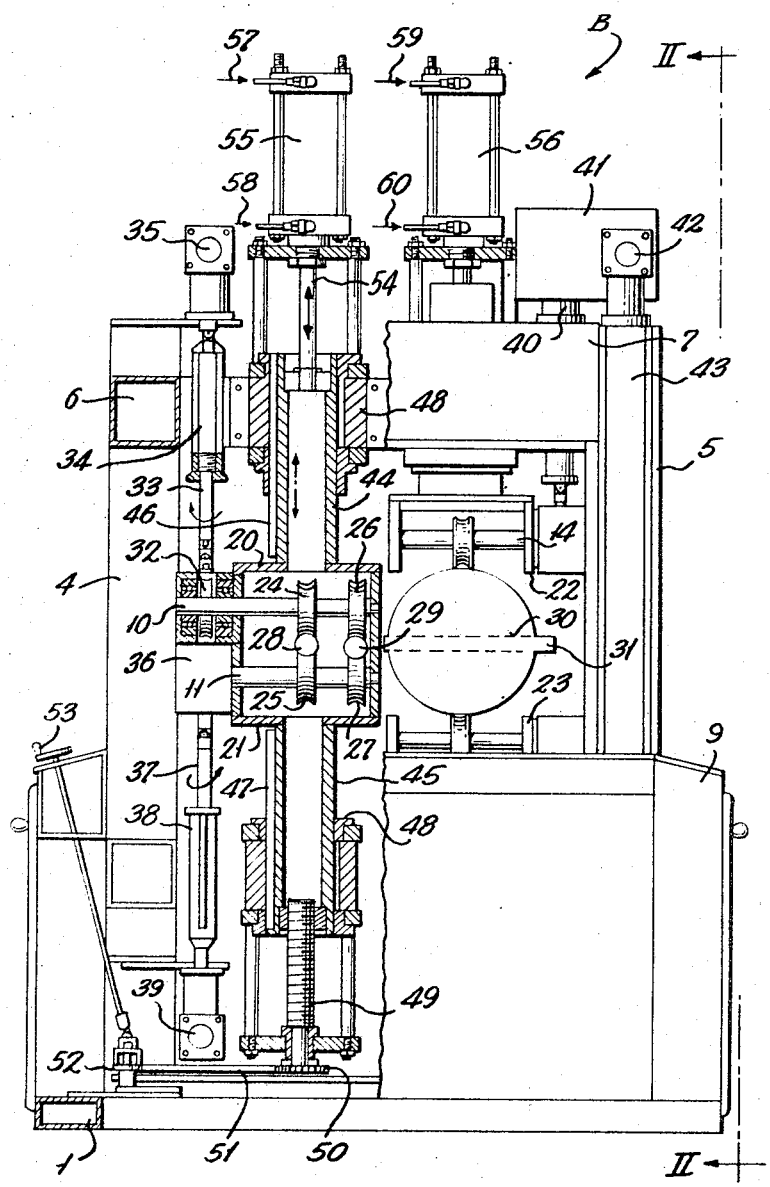

This invention relates to a profile-casting apparatus or machine for processing of synthetic thermoplastics, and more particularly to a profile-casting apparatus having extruder means for forming molten thermoplastics into shaped profiles, such as rods, beams, plates, tubes and the like shaped structures having defined profiles, and a drawing-off system or means which is capable of simultaneously drawing-off a plurality of the shaped profiles and/or a single shaped profile of substantially differing cross-sectional dimensions.

With known apparatus for processing synthetic thermoplastics the drawing-off system is as a rule adapted to draw off a single structure with a profile having cross-sectional dimensions which may only vary between rather narrow limits.

Accordingly, there is need for an apparatus with which it is possible simultaneously to draw off a plurality of shaped structures with defined profiles and/or which permits a wider variation in the cross-sectional dimensions of the structures. For instance, there is particularly a need for an apparatus adapted to draw off four shaped structures having profiles about 1 centimeter in diameter and which is also capable of drawing off a single shaped structure with a profile about 15 centimeters in diameter. It is also desirable to provide such an apparatus suitable for drawing off beam-shaped or board-shaped profiles.

Advantageously, the present invention provides an apparatus that makes it possible to satisfy all these requirements. With the construction of the apparatus according to the invention it has even been found possible, for instance, to draw off a bar with a thick profile simultaneously with, but at a lower speed than, two bars with thinner profiles. The apparatus has also been found suitable for drawing-off shaped structures with tubular profiles.

Thus this invention contemplates a profile-casting apparatus comprising extruder means for forming the molten thermoplastics into shaped structures with defined profiles, and a drawing-off means comprising a plurality of pairs of driven shafts, each mounted one after the other in the direction of transporting the shaped structures, the shafts of each pair being placed horizontal and one over the other with their ends supported in upper and lower crossheads, said crossheads being attached to members sliding between vertical guides, the members for the lower crossheads being set, i.e. adjustable, to pre-determined positions, and the members for the upper crossheads being displaced by a power source, i.e. a control means, all of the shafts being driven at the same speed by a common driving system or means, the direction of rotation of the upper shafts being opposite to that of the lower shafts of each pair and one or more drawing-off elements, e.g. a wheel or roll, being exchangeably mounted on each of said shafts.

In order that the drive of the shafts may follow their vertical movement the shafts may be driven by belts, ropes or toothed belts. However, in order to have the speed of the shafts as nearly constant as possible, in accordance with this invention, it is preferred to have the shafts driven, via worm gear boxes, by vertically extending, telescoping shafts which, in turn, are coupled to a common upper main shaft and a common lower main shaft, which take their rotary movement from the same main driving mechanism.

With the aid of this apparatus the shafts may be positioned relative to each other at widely varying distances. As a result, the apparatus is suitable for drawing off structures having profiles of widely varying cross-sectional dimensions. By replacing the wheels on the shafts with drawing-off rolls it is also possible to extrude and draw off structures having wide, flat profiles.

According to the invention a particularly advantageous construction is obtained if the above-described apparatus is combined in one frame with a second such apparatus so that the two apparatus are arranged symmetrical or parallel to each other, the shafts of the two apparatus being co-axial. As a result, the combined apparatus not only has a double capacity, but also is capable of processing structures having plate-shaped or bar-shaped profiles of double width.

Figure 2:
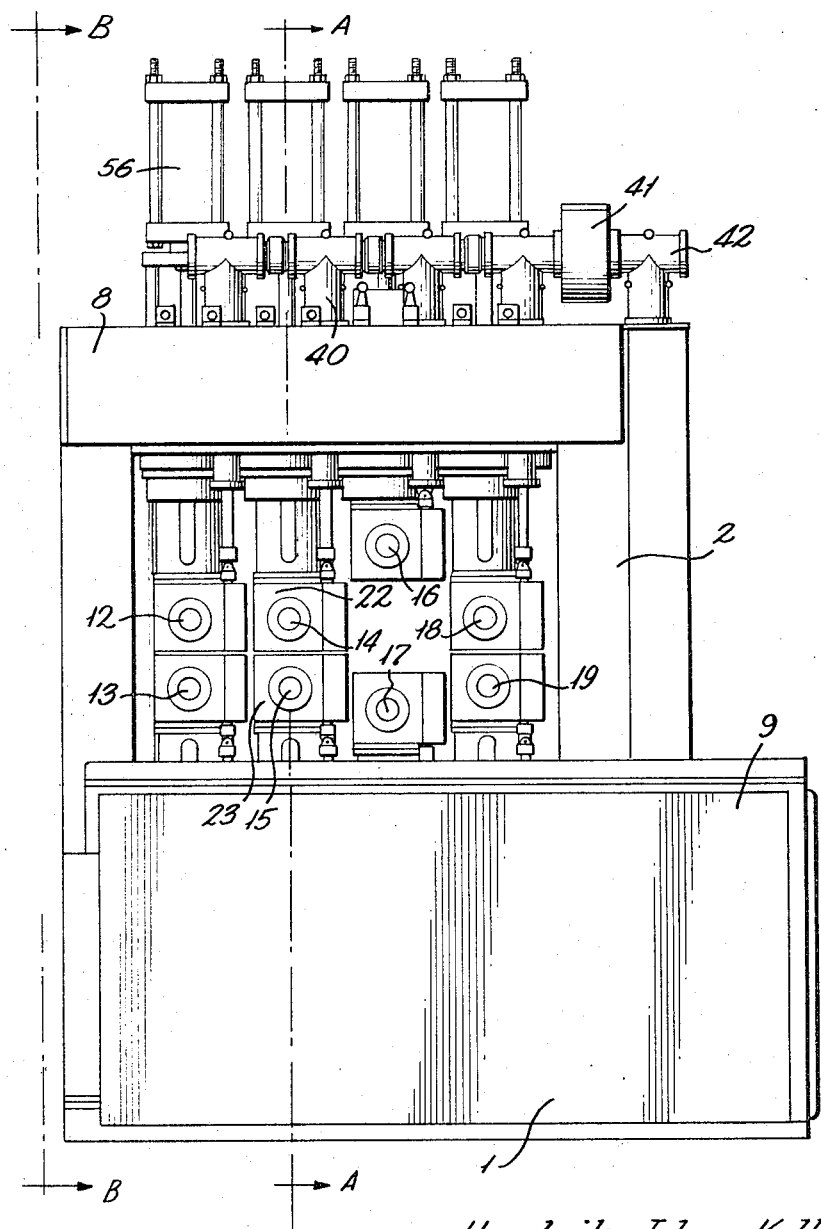

The invention will now be further described with reference to the drawings that show a specific embodiment thereof, in which FIGURE 1 shows the apparatus of the invention, partly in elevation and partly in section, in the direction of transport of the extruded profiles; and FIGURE 2 shows an elevation of the apparatus taken along line II—II in FIGURE 1.

The drawings only show the drawing-off system of the profile-casting apparatus, the extruder means, e.g. a screw extruder containing a die means, essentially being of conventional design. The left half of FIGURE 1 illustrates the apparatus in section taken along line A—A in FIGURE 2 and the right half of FIGURE 1 shows an elevational view of the apparatus taken along the line B—B in FIGURE 2.

The drawing-off system is supported by a frame which substantially consists of box girders. The base is formed by four box girders 1 arranged in a rectangular configuration. Attached to the base are columns 2, 3, 4 and 5 which, in their turn, are intercoupled by a number of box girders and plates, some of which are shown in the drawings, i.e., the elements referred to by the reference numerals 6, 7 and 8.

In the figures like parts are indicated by like reference numerals; FIGURES 1 and 2 should therefore be considered together.

The bottom end of the apparatus is covered with a rectangular-shaped plating, in which there is located, inter alia, a main driving mechanism (not shown). The apparatus comprises two series of shaft pairs, one series being mounted alongside of the other and each series consisting of four pairs. FIGURE 2 shows the four pairs (12, 13); (14, 15); (16, 17); (18, 19) of one series. The left half of FIGURE 1 shows a pair of shafts 10, 11 of the other series. The shaft 10 is supported in a crosshead 20, and the shaft 11 in a crosshead 21, which faces the crosshead 20.

In a similar manner the shafts 14 and 15 are rotatably supported in crossheads 22 and 23. Likewise the shafts 12 and 13 and the shafts 16 to 18, inclusive, are mounted in crossheads. Mounted on the shaft 10 are two wheels 24 and 26, and on the shaft 11 are two wheels 25 and 27. The wheels 24 and 25 together form a pair adapted to draw off a structure with profile 28. The wheels 26 and 27 are capable of drawing-off a structure with a profile 29.

The force with which the structures with defined profiles are drawn off from the profile-casting machine is increased in that each structure with a defined profile is forwarded by four wheel pairs placed one after another.

If there is a change to structures with larger profiles or to structures with profiles of a different shape, the drawing-off wheels, too, will have to be spaced further apart, be given a different shape, or be mounted on the shafts in a different number. For instance, in FIGURE 1 a single wheel is mounted on the shaft 14. This wheel is in contact with an extra thick round profile 30. If a plate-shaped or board-shaped profile 31, as shown in dash lines is to be drawn off, then the wheels will have to be replaced by rolls.

The shaft 10 is driven by means of a worm wheel 32 and a worm (not shown) that is in contact therewith and which, in its turn, is rotated by a shaft 33. The shaft 33 may telescope into and is rotated by a second shaft section 34. Consequently, it is possible for the shaft 10 to be driven in any vertical position of the crosshead 20. The shaft section 34 is, by way of a bevel gear which is contained in the unit 35, driven by a common, horizontal, longitudinally extending shaft.

In the same manner the shaft 11 is rotated by way of drive members 36 to 39 inclusive. FIGURE 2 shows how a plurality of units 40 containing bevel gears are located one after another. The common longitudinally extending shaft for the said units 40 is, via a reduction gearbox 41, a bevel gear 42 contained in a unit, and a vertical main driving shaft 43, driven by the main driving mechanism for the machine, which is housed in the box 9.

In the same manner the upper shafts of the other series of wheels, and the two lower shafts 39 extending in the longitudinal direction are centrally driven.

The crossheads 20 and 21 are attached to vertically mounted tubes 44 and 45, which carry keys 46 and 47, respectively. The tubes 44 and 45 can be moved up and down, with the keys sliding in lower and upper guides 48. The position of the lower crosshead 21 is set with the adi of a screw spindle 49 which can, by way of a system of sprockets 50 and 52 and a chain 51, be turned by turning a hand wheel 53.

The tube 44 can be moved vertically upwards or downwards with the aid of a hydraulic pressure cylinder 55. To this end, the tube 44 is attached to the piston rod 54 of the cylinder 55. A pressure medium can be fed to the top or bottom of the hydraulic pressure cylinder via feed conduits 57 and 58.

The operation of the apparatus is as follows: if a structure with a profile of given dimensions is to be cast, the first step is, with the aid of the hand wheels 53, to bring the lower crossheads into such positions that the cast structure may be supported in a straight path by the lower wheels. When the structure has passed all four successive wheels, the upper wheels are pressed downwards by applying pressure to the space above the pistons of the hydraulic pressure cylinders. As a result, the structure is clamped between pairs of the drawing-off wheels, the speed of which is communicated to the structure. In this way the structures with defined profiles are drawn off from the screw extruder at an accurately constant speed; as a result of which, the profiles of the cast structures have very uniform dimensions.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. A profile-casting apparatus for the processing of synthetic thermoplastics, comprising extruder means for forming the molten thermoplastics into shaped structures with defined profiles, and a drawing-off means for drawing-off and transporting the shaped structures, said drawing-off means comprising a plurality of pairs of driven shafts, mounted one after the other in the direction of transporting the structures, the shafts of each pair being placed horizontal and one over the other, upper and lower crossheads for supporting the ends of the upper and lower shafts in each pair, respectively, said crossheads being attached to members sliding between vertical guides, the members for the lower crossheads being adjustable to pre-determined positions, and the members for the upper crossheads being displaced by a control means, all the shafts being driven at the same speed by a common driving means, the direction of rotation of the upper shafts being opposite to that of the lower shafts of each piar and at least one drawing-off element being exchangeably mounted on each of said shafts.

2. The apparatus of claim 1 in which the upper and lower shafts of each pair are driven, respectively, via worm gear boxes by vertically extending, telescoping shafts, said telescoping shafts, in turn, being coupled, respectively, to a common upper main shaft and a common lower main shaft, said main shafts taking their rotary movement from the same driving mechanism.

3. The appartus of claim 1 further comprising a second such apparatus combined in one frame, so that said two apparatus are arranged symmetrically and in parallel, the driven shafts of the two apparatus being co-axial.

References Cited

UNITED STATES PATENTS

| | | |
|---|---|---|
| 2,872,965 | 2/1959 | Sesson. |
| 3,221,370 | 12/1965 | Corbett. |
| 3,239,881 | 3/1966 | Larsen. |

WILLIAM J. STEPHENSON, *Primary Examiner.*

U.S. Cl. X.R.

72—257